United States Patent [19]

Tamai et al.

[11] Patent Number: 4,903,532
[45] Date of Patent: Feb. 27, 1990

[54] ELECTROSTATIC CAPACITY TYPE PRESSURE DETECTOR

[75] Inventors: Mitsuru Tamai; Kimihiro Nakamura; Teizo Takahama; Mikihiko Matsuda, all of Kanagawa, Japan

[73] Assignee: Fuji Electric Co., Ltd., Kanagawa, Japan

[21] Appl. No.: 226,915

[22] Filed: Aug. 1, 1988

[30] Foreign Application Priority Data

Aug. 13, 1987 [JP] Japan ................. 62-202221

[51] Int. Cl.$^4$ ............................ G01L 7/08; G01L 9/12
[52] U.S. Cl. ....................................... 73/718; 73/724; 361/383
[58] Field of Search ................... 73/718, 724; 361/383

[56] References Cited

U.S. PATENT DOCUMENTS

| | | | |
|---|---|---|---|
| 4,196,632 | 4/1989 | Sikorra | 73/718 |
| 4,445,383 | 5/1984 | Binder et al. | 73/718 |
| 4,542,435 | 9/1985 | Freud et al. | 361/283 |
| 4,581,676 | 4/1986 | Baxter et al. | 73/718 |

*Primary Examiner*—Donald O. Woodiel
*Attorney, Agent, or Firm*—Finnegan, Henderson, Farabow, Garrett and Dunner

[57] ABSTRACT

An electrostatic capacity type pressure detector having a central diaphragm, which is deformed by pressure, and a fixed electrode on each side of the diaphragm. Each of the fixed electrodes includes a first electrically conductive plate confronting the diaphragm, an insulating plate joined to the first conductive plate, and a second electrically conductive plate joined to the first plate. An annular support joined to the diaphragm and to the insulating plate surrounds but is insulated from the first electrically conductive plate. A hole in the electrode introduces pressure into a space defined by the electrode and the diaphragm.

7 Claims, 5 Drawing Sheets

ELECTROSTATIC CAPACITY TYPE PRESSURE DETECTOR

BACKGROUND OF THE INVENTION

1. Field of the Invention

This invention relates to an electrostatic capacity type pressure detector.

2. Description of the Prior Art

FIG. 6 is a sectional view showing the arrangement of essential components of a conventional electrostatic capacity type pressure detector. FIG. 6 includes a diaphragm 1 of silicon; fixed electrodes 2 and 3, bonded to the diaphragm 1 through glass junctions 4 and 5 having a predetermined thickness; a gap 8 formed between the diaphragm 1 and the fixed electrode 2; a gap 9 formed between the diaphragm 1 and the fixed electrode 3; a pressure introducing hole 6 formed in the fixed electrode 2 to introduce a pressure $P_1$ into the gap 8; and a pressure introducing hole 7 formed in the fixed electrode 3 to introduce a pressure $P_2$ into the gap 9.

The diaphragm 1 and the electrode 2 form a first capacitor, having a capacitance Ca, which is detected through a lead pin a and a lead pin c. Similarly, the diaphragm 1 and the electrode 3 form a second capacitor, having a capacitance Cb, which is detected through a lead pin b and the lead pin c.

When the pressures $P_1$ and $P_2$ are applied to the diaphragm 1, the diaphragm 1 is displaced according to the difference between the pressures $P_1$ and $P_2$ ($P_1-P_2$), while the capacitances Ca and Cb change with the displacement of the diaphragm 1. Therefore, the pressure difference can be measured from the changes of the capacitances.

The pressure detector shown in FIG. 6 generally is accommodated in a housing, which is closed with two seal diaphragms adapted to receive the pressures $P_1$ and $P_2$. The housing is filled with a pressure transmitting non-compressive fluid such as silicon oil. Therefore, the gaps 8 and 9, and the pressure introducing holes 6 and 7 are filled with the silicon oil.

In practice, two capacitors are formed, for instance, between the diaphragm 1 and the fixed electrode 2. The diaphragm 1 and the fixed electrode 2 with the gap 8 form one of the two capacitors. The capacitance Ca for the one capacitor is:

$$Ca = \epsilon a \cdot Sa / da \quad (1)$$

where $\epsilon a$ is the dielectric constant of the gap 8, Sa is the electrode area in the gap 8, and da is the length of the gap 8. The capacitance Ca changes with the displacement of the diaphragm 1.

The other capacitor is formed by the diaphragm 1 and the fixed electrode 2 with the glass junction 4, and its capacitance Csa is:

$$Csa = \epsilon sa \cdot Ssa / dsa \quad (2)$$

where $\epsilon sa$ is the dielectric constant of the glass junction 4, Ssa is the area of the glass junction 4, and dsa is the thickness of the glass junction 4. The capacitance Csa is determined independently of the displacement of the diaphragm 1 and, thus, is obstructive to the measurement of pressure.

Similarly, two capacitors are formed between the diaphragm 1 and the fixed electrode 3. If the capacitance of one of the two capacitors, which is formed by the diaphragm 1 and the electrode 3 with the gap 9, is represented by Cb, and the capacitance of the other formed by the diaphragm 1 and the electrode 3 with the glass junction 5 is represented by Csb, then Cb and Csb can be represented by equations similar to equations (1) and (2).

The capacitances Ca, Cb, Csa and Csb are electrically connected as shown in FIG. 7. Therefore, the capacitance $C_{10}$ between the lead pins a and c, and the capacitance $C_{20}$ between the lead pins b and c can be expressed by the following equations (3) and (4), respectively:

$$C_{10} = Ca + Csa \quad (3)$$

$$C_{20} = Cb + Csb \quad (4)$$

Next, the fact that the capacitances Csa and Csb are obstructive to the measurement of the capacitances Ca and Cb will be further described.

By way of example, it is assumed that each of the diaphragm 1 and the electrodes 2 and 3 is a 9 mm×9 mm square, that the gaps 8 and 9 are circular cylinders having a diameter of 7 mm and filled with silicon oil, and that the glass junctions 4 and 5 are of SM-36A (a trademark of "Nippon Denki Garasu (Japan Electric Glass Co., Ltd.). In this case, when the length of the gaps 8 and 9 and the thickness of the glass junctions 4 and 5 are 12 $\mu$m, the capacitances Ca and Csa are as follows:

$$Ca = \frac{\epsilon a \cdot Sa}{da} \quad (5)$$
$$= \frac{(2.65 \times 8.85 \times 10^{-14}) \times (3.14159 \times 0.35^2)}{0.0012}$$
$$= 75.21 \text{ (pF)}$$

$$Csa = \frac{\epsilon Sa \cdot Ssa}{dsa} \quad (6)$$
$$= \frac{(4.8 \times 8.85 \times 10^{-14}) \times (0.81 - 3.14159 \times 0.35^2)}{0.0012}$$
$$= 150.50 \text{ (pF)}$$

In equations (5) and (6), 2.65 and 4.8 are the specific inductive capacity of the silicon oil and the specific inductive capacity of the SM-36A mentioned above, respectively, and $8.85 \times 10^{-14}$ is the dielectric constant of vacuum.

As is apparent from equations (5) and (6), the capacitance Csa not concerning the measurement affects the capacitance $C_{10}$ approximately twice as much as the capacitance Ca concerning the measurement and, thus, is obstructive to the measurement.

This will be described mathematically in more detail.

When the diaphragm 1 is displaced by $\Delta$ to the left by the difference between the pressures $P_1$ and $P_2$, equation (1) can be rewritten as follows:

$$Ca = \epsilon a \cdot Sa / (da - \Delta) \quad (7)$$

Similarly, if the dielectric constant of the gap 9 is represented by $\epsilon b (= \epsilon a)$, the electrode area in the gap 9 is represented by $Sb (= Sa)$, and the length of the gap 9 is represented by $db (= da)$, then the capacitance Cb can be expressed by the following equation:

$$Cb = \epsilon b \cdot Sb / (db - \Delta) \quad (8)$$

If the dielectric constant of the glass junction 5 is represented by $\epsilon sb(=\epsilon sa)$, the area of the glass junction 5 is represented by $Ssb(=Ssa)$, and the thickness of the glass junction 5 is represented by $dsb(=dsa)$, then the capacitance Csa can be expressed by the following equation:

$$Csb = \epsilon sb \cdot Ssb/(dsb) \qquad (9)$$

The fixed electrodes 2 and 3 are arranged symmetrically with respect to the diaphragm 1. Therefore, the following equation is established:

$$\left.\begin{array}{rcccl}\epsilon a & = & \epsilon b & = & \epsilon \\ Sa & = & Sb & = & S \\ da & = & db & = & d \\ Csa & = & Csb & = & Cs \\ \epsilon sa & = & \epsilon sb & = & \epsilon s \\ Ssa & = & Ssb & = & Ss \\ dsa & = & dsb & = & ds \\ d & = & ds. & & \end{array}\right\} \qquad (10)$$

Therefore, equations (3) and (4) can be rewritten as follows:

$$\begin{aligned} C_{10} &= Ca + Csa \qquad (11)\\ &= \frac{\epsilon \cdot S}{d - \Delta} + Cs \\ &= Co\frac{1}{1 - \Delta/d} + Cs \end{aligned}$$

$$\begin{aligned} C_{20} &= Cb + Csb \qquad (12)\\ &= \frac{\epsilon \cdot S}{d + \Delta} + Cs \\ &= Co\frac{1}{1 + \Delta/d} + Cs \end{aligned}$$

where $Co = \epsilon \cdot S/d$, and  (13)

$$Cs = \epsilon s \cdot Ss/ds$$

On the other hand, as it well known in the art, in the case Where one pair of capacitances $C_{10}$ and $C_{20}$ change differentially, a signal proportional to the displacement of the diaphragm 1 is obtained according to the following equation:

$$\begin{aligned} f &= \frac{C_{10} - C_{20}}{C_{10} + C_{20}} \qquad (14)\\ &= \frac{(Co/(1 - \Delta/d) + Cs) - (Co/(1 + \Delta/d) + Cs)}{(Co/(1 - \Delta/d) + Cs) + (Co/(1 + \Delta/d) + Cs)} \\ &= \frac{\Delta/d}{1 + \frac{Cs}{Co}\left(1 - \left(\frac{\Delta}{d}\right)^2\right)} \end{aligned}$$

If, in equation (14), $Cs/Co < 1$, then $$f \equiv \Delta/d \propto (P_2 - P_1) \qquad (15)$$

Thus, the signal f is proportional to the displacement $\Delta$, i.e., the pressure difference $(P_2 - P_1)$ can be obtained.

However, in the case of FIG. 6, $$\frac{Cs}{Co} = \frac{\epsilon s \cdot Sc/ds}{\epsilon \cdot S/d} = \frac{\epsilon s \cdot Sc}{\epsilon \cdot S} =$$

$$\frac{(4.8 \times 8.85 \times 10^{-14}) \times (0.81 - 3.14159 \times 0.35^2)}{(2.65 \times 8.85 \times 10^{-14}) \times (3.14159 \times 0.35^2)} \approx 2$$

That is, the condition $Cs/Co < 1$ has not established. Therefore, the denominator of equation (14) includes the term $(\Delta/d)^2$, and the proportional relation of the signal f to the pressure difference $\Delta p$ (=$P_2 - P_1$) is greatly adversely affected by Cs. That is, the linearity of the signal f with respect to the pressure difference $\Delta P$ is made much worse.

The condition $Cs/Co < 1$ may be established by greatly increasing the electrode areas S in the gaps 8 and 9. However, this method is disadvantageous because the pressure detector unavoidably becomes considerably large in its entire arrangement.

SUMMARY OF THE INVENTION

It is an object of the present invention to provide an electrostatic capacity type pressure detector in which the linearity of the signal with respect to the pressure difference is excellent.

Additional objects and advantages of the invention will be set forth in part in the description which follows and, in part, will be obvious from the description or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a diaphragm deformable by pressure; and a pair of fixed electrodes provided on both sides of the diaphragm, respectively, with a predetermined distance therebetween to form a pair of capacitors therebetween, each of the pair of fixed electrodes comprising an electrode unit including a first electrically conductive plate confronting the diaphragm, an insulating plate joined to the first electrically conductive plate, and a second electrically conductive plate joined to the insulating plate, the first electrically conductive plate being electrically connected to the second electrically conductive plate, an annular support that is joined to the insulating plate in such a manner as to surround the first electrically conductive plate, and is joined to the diaphragm, the annular support being electrically insulated from the first electrically conductive plate, and a pressure introducing hole for introducing pressure into a space defined by the electrode unit and the diaphragm.

With the electrostatic capacity type pressure detector, unwanted capacitances adversely affecting the measurement are substantially limited to those provided at the insulating plate, and such capacitances can be much smaller than those concerning the measurement by setting the thickness of the insulating plate to a suitable predetermined value.

The accompanying drawings, which are incorporated in and constitute a part of this specification, illustrate several embodiments of the invention and, together with the description, serve to explain the principles of the invention.

DESCRIPTION OF THE PREFERRED EMBODIMENTS

Preferred embodiments of this invention will be described with reference to the accompanying drawings in detail. Whenever possible, the same reference numbers will be used throughout to refer to the same or like parts.

Figure 1:
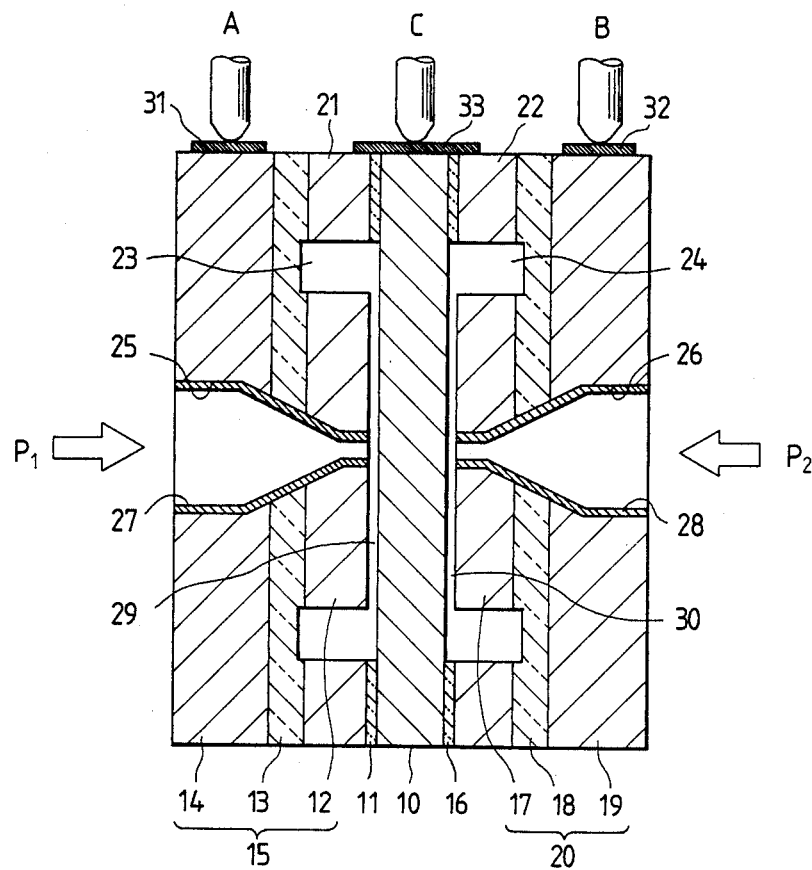
FIG. 1 is a sectional view showing one embodiment of the present invention.
Figure 2A:
FIGS. 2(a) through 2(f) are explanatory diagrams showing an example of a process of manufacturing an electrode unit in the embodiment of FIG. 1.
Figure 2B:
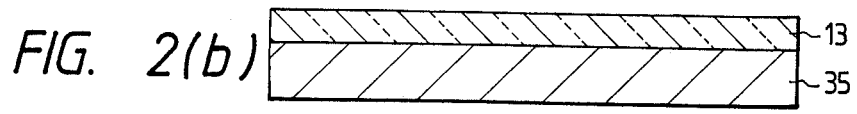
Figure 2C:
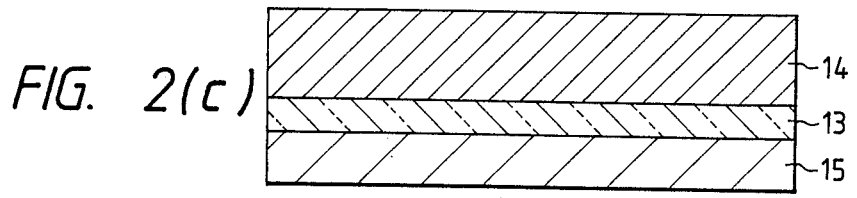
Figure 2D:
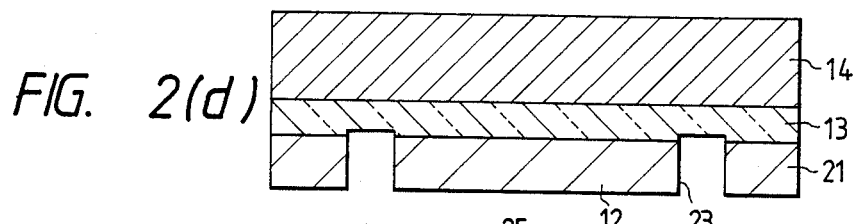
Figure 2E:
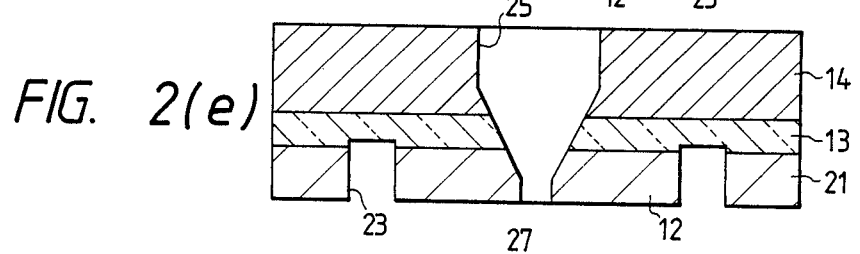
Figure 2F:
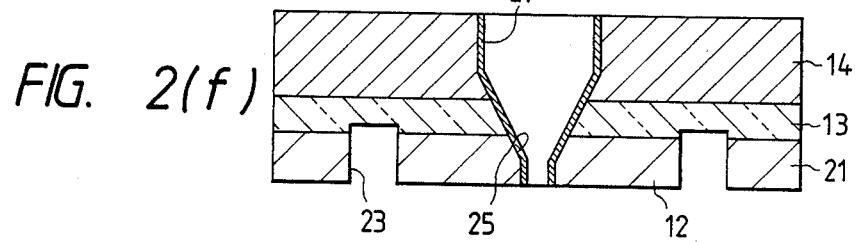

FIG. 1 is a sectional view showing a first embodiment of the invention. In FIG. 1, reference numeral 10 designates a diaphragm of silicon. A pair of electrode units 15 and 20 serving as fixed electrodes are provided on both sides of the diaphragm 10, respectively. The electrode unit 15 includes a first electrically conductive plate 12 confronting the diaphragm 10, an insulating plate 13 joined to the first electrically conductive plate 12, for example, by glass powder baking or by using an Al-Si eutectic, and a second electrically conductive plate 14 also joined to the insulating plate 13, for example, by glass powder baking or by using an Al-Si eutectic. The first electrically conductive plate 12 and the second electrically conductive plate 14 are made of silicon, and the insulating plate 13 is formed from cordierite.

A pressure introducing hole 25 is formed in the electrode unit 15 for the purpose of introducing a pressure $P_1$. An inner wall of the pressure introducing hole 25 is covered with a conductor film 27 so that the first electrically conductive plate 12 is electrically connected to the second electrically conductive plate 14 through the conductor film 27.

A support 21 is joined to the insulating plate 13 of the electrode unit, for example, by glass powder baking or by using an Al-Si eutectic, in such a manner that it surrounds the first electrically conductive plate 12, but is electrically insulated from the plate 12 by means of a circular groove 23. In the embodiment, the support 21 is made of the same material, silicon, as the first electrically conductive plate 12, and is connected in a gas-tight manner to the diaphragm 10 through a glass junction member 11 having a predetermined thickness. An air gap 29 is formed between the diaphragm 10 and the first electrically conductive plate 12 of the first electrode unit 15.

Similarly, the other electrode unit 20 includes a first electrically conductive plate 17 confronting the diaphragm 10, an insulating plate 18 joined to the first electrically conductive plate 17, for example, by glass powder baking or by using an Al-Si eutectic, and a second electrically conductive plate 19 joined to the insulating plate 18, for example, by glass powder baking of by using an Al-Si eutectic. The first electrically conductive plate 17 and the second electrically conductive plate 19 are made of silicon, and the insulating plate 18 is made of cordierite.

A pressure introducing hole 26 is formed in the electrode unit 20 for the purpose of introducing a pressure $P_2$. An inner wall of the pressure introducing hole 26 is covered with a conductor film 28, so that the first electrically conductive plate 17 is electrically connected to the second electrically conductive plate 19 through the conductor film 28.

A support 22 is joined to the insulating plate 18 of the electrode unit 20, for example, by glass powder baking or by using an Al-Si eutectic, in such a manner that it surrounds the first electrically conductive plate 17, and is connected in a gas-tight manner to the diaphragm 10 through a glass junction member 16 having a predetermined thickness. An air gap 30 is formed between the diaphragm 10 and the first electrically conductive plate 17 of the second electrode unit 20.

As is apparent from the above description, the first and second electrode units 15 and 20 are identical in structure and configuration, and are arranged symmetrically with respect to the diaphragm 10.

An electrostatic capacitance output conductor 31 is provided on the second electrically conductive plate 14 of the first electrode unit 15, an electrostatic capacitance output conductor 31 is provided on the second electrically conductive plate 19 of the second electrode unit 20, and an electrostatic capacitance output conductor 33 is provided on the support 21, the diaphragm 10, and the support 22. Furthermore, lead pin A, B, and C are electrically connected to the electrostatic capacitance output conductors 31, 32, and 33, respectively.

The diaphragm 10 and the first electrically conductive plate 12 of the first electrode unit 15 form a first capacitor having capacitance $C_A$ that is detected through the lead pins A and C. Similarly, the diaphragm 10 and the first electrically conductive plate 17 of the second electrode unit 20 form a second capacitor having capacitance $C_B$ that is detected through the lead pins B and C. Upon application of the pressures $P_1$ and $P_2$, the diaphragm 10 is displaced by the pressure difference. Therefore, the pressure difference can be measured from the displacement of the diaphragm 10.

An example of a method of manufacturing the electrode units 15 and 20 will be described with reference to FIG. 2. The electrode units 15 and 20 are identical in structure to each other and, therefore, only the method of manufacturing the electrode unit 15 will be described. First, as shown in the parts (a) and (b) of FIG. 2, a square electrically conductive plate 13 is joined to the conductive plate 35 by glass powder baking or by using an Al-Si eutectic. Thereafter, as shown in the part (c) of FIG. 2, a square electrically conductive plate 14 of silicon is joined to the insulating plate 13 by glass powder baking or by using an Al-Si eutectic. Next, as shown in the part (d) of FIG. 2, an annular groove 23 is formed in the conductive plate 35 by ultrasonic machining, as a result of which the first electrically conductive plate 12 in the form of a disc and the support 21 are formed.

The pressure introducing hole 25 is then formed by ultrasonic machining as shown in part (e) of FIG. 2, and the inner wall of the pressure introducing hole 25 is covered with the conductor film 27 as shown in the part (f) of FIG. 2. The first electrically conductive plate 12 and the support 21 are formed from the electrically conductive plate 35, which causes the surfaces of the plate 12 and the support 21 to be flush with each other. Accordingly, in bonding the support 21 through the glass joint member 11 to the diaphragm 10, the space between electrically conductive plate 12 and the diaphragm 10 can be maintained as required. This will be described in more detail below.

In the case where the support 21 and the first electrically conductive plate 12 are formed by using separate electrically conductive plates, the support 21 and the plate 12 are bonded to the insulating plate 13 separately (or individually), and it is necessary to detect whether or not the surfaces of the support 21 and the plate 12 are flush with each other or to detect the difference between the thickness of the support 21 and the plate 12. If the surfaces of the support 21 and the plate 12 are not flush, then it is difficult to accurately detect the distance between the diaphragm 10 and the first electrically conductive plate 12. On the other hand, in the case where, as was described above, the first electrically conductive plate 12 and the support 21 are formed from the same electrically conductive plate 35, the distance between the electrically conductive plate 12 and the diaphragm 10 can be accurately detected from the thickness of the glass junction member 11 disposed between the support 21 and the diaphragm 10.

Next, the electrostatic capacitance of the electrostatic capacity type pressure detector thus constructed according to the invention will be described.

Figure 3:
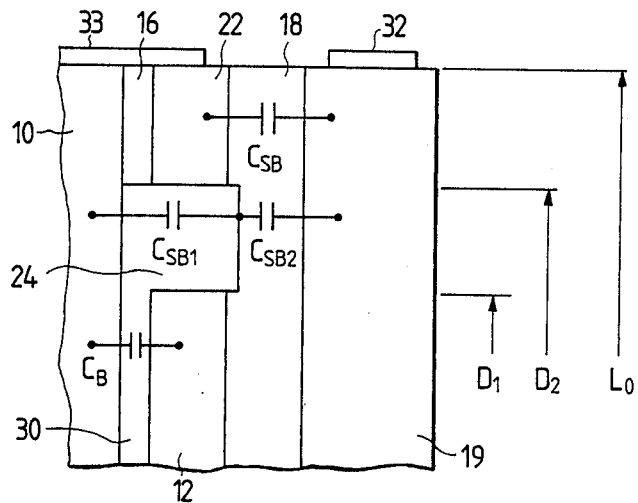
FIG. 3 is an explanatory diagram showing a part of the embodiment shown in FIG. 1.

FIG. 3 is an explanatory diagram showing a part of the electrostatic capacity type pressure detector of FIG. 1. As shown in FIG. 3, the diaphragm 10 and the first electrically conductive plate 17 of the second electrode unit 20 with the gap 30 therebetween form a capacitor having a capacitance $C_B$. The support 22 and the second electrically conductive plate 19 with the insulating plate 18 therebetween form a capacitor having a capacitance $C_{SB}$. Furthermore, the diaphragm 10, the gap 24, the insulating plate 18, and the second electrically conductive plate 19 form two capacitors having capacitances $C_{SB1}$ and $C_{SB2}$. The capacitance $C_{SB1}$ concerns the dielectric constant of the gap 24, and the capacitance $C_{SB2}$ concerns the dielectric constant of the insulating plate 18. The diaphragm 10, the glass junction member 16, and the support 22 form no capacitor, because the diaphragm 10 is electrically connected to the support 22 through the electrostatic capacity output conductor 33.

Figure 4A:
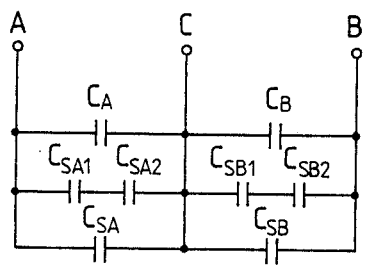
FIGS. 4(a) through 4(b) are circuit diagrams showing the connection of capacitances in the embodiment of FIG. 1.
Figure 4B:
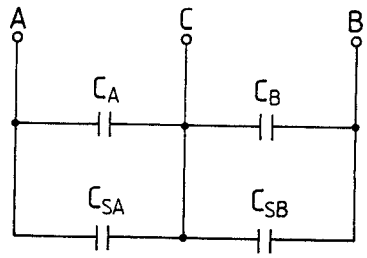

As was described above, the electrode units 15 and 20 are the same in structure, and are arranged symmetrically with respect to the diaphragm 10. Therefore, the electrode unit 15 has the same capacitances as the electrode unit 20. That is, the electrode unit 15 has capacitances $C_A$, $C_{SA}$, $C_{SA1}$, and $C_{SA2}$ which correspond to capacitances $C_B$, $C_{SB}$, $C_{SB1}$, and $C_{SB2}$ of the electrode unit 20, respectively. Accordingly, it can be considered that the capacitances of the pressure detector shown in FIG. 1 are connected as shown in the part (a) of FIG. 4. In FIG. 4, reference characters A, B, and C designate the lead pins. If the total capacitance between the lead pins A and C is represented by $C_1$, and the total capacitance between the lead pins B and C is represented by $C_2$, then $C_1$ and $C_2$ are as follows:

$$C_1 = C_A + C_{SA} + \frac{C_{SA1} \cdot C_{SA2}}{C_{SA1} + C_{SA2}} \quad (17)$$

$$C_2 = C_B + C_{SB} + \frac{C_{SB1} \cdot C_{SB2}}{C_{SB1} + C_{SB2}} \quad (18)$$

In the equation (18), $C_B$, $C_{SB}$, $C_{SB1}$, and $C_{SB2}$ can be represented by the following equations:

$$C_B = \epsilon_B \cdot S_B / d_B \quad (19)$$

where $S_B$ is the area of the first electrically conductive plate 17, $\epsilon_b$ is the dielectric constant of the air gap 30, and $d_B$ is the length of the air gap 30.

$$C_{SB} = \epsilon_{SB} \cdot S_{SB} / d_{SB} \quad (20)$$

where $S_{SB}$ is the area of the support 22, $\epsilon_{SB}$ is the dielectric constant of the insulating plate 18, and $d_{SB}$ is the thickness of the insulating plate 18.

$$C_{SB1} = \epsilon_B \cdot S_{SB1} / (d_{SB} + d_B) \quad (21)$$

$$C_{SB2} = \epsilon S_{SB1} / d_{SB} \quad (22)$$

where $S_{SB1}$ is the area of the annular groove 24, and $d_{SB1}$ is the the thickness of the annular groove 24.

The electrostatic capacity type pressure detector of the invention shown in FIG. 1, which is substantially equal in size to the conventional one shown in FIG. 6, will be described concretely with numerical data.

In FIG. 3, the length $L_o$ of each side of the second electrically conductive plate 19 in the form of a square, the diameter $D_1$ of the first electrically conductive plate 17 in the form of a disc, and the outer diameter $D_2$ of the annular groove 24 are as follows:

$$L_o = 9 \text{ mm}, D_1 = 5.8 \text{ mm}, D_2 = 6.7 \text{ mm}.$$

The thicknesses $d_B$, $d_{SB}$ and $d_{SB1}$ in equations (19), (20), and (21) are as follows:

$$d_B = 12 \text{ }\mu\text{m}, d_{SB} = 0.5 \text{ mm}, d_{SB1} = 1.5 \text{ mm}.$$

In the case where the air gap 30 and the annular groove 24 of FIG. 1 are filled with a non-compressive fluid such as silicon oil, the dielectric constant $\epsilon_B$ thereof and the dielectric constant $\epsilon_{SB}$ of the cordierite forming the insulating plate 18 are as follows:

$$\epsilon_B = 2.65 \times 8.85 \times 10^{-14}$$

$$\epsilon_{SB} = 5.8 \times 8.85 \times 10^{-14}$$

where the value 5.8 is the specific inductive capacity of cordierite.

The above-described electrostatic capacitances $C_B$, $C_{SB}$, $C_{SB1}$, and $C_{SB2}$ can be calculated by using these numerical data as follows:

$$C_B = 51.64 \text{ pF}$$

$$C_{SB} = 4.70 \text{ pF}$$

$$C_{SB1} = 0.91 \text{ pF}$$

$$C_{SB2} = 0.137 \text{ pF}$$

The capacitance of the series circuit of $C_{SB1}$ and $C_{SB2}$ is $C_{SB\ 1} \cdot C_{SB2}/(C_{SB1} + C_{SB2}) = 0.119$ pF. Therefore, equation (18) will have the following value:

$$\begin{aligned} C_2 &= C_B + C_{SB} + \frac{C_{SB1} \cdot C_{SB2}}{C_{SB1} + C_{SB2}} \\ &= 51.64 + 4.70 + 0.119 \\ &= 51.46 \text{ pF} \end{aligned} \quad (23)$$

As is apparent from equation (23), the undesirable capacitances $C_{SB}$ and $(C_{SB1} \cdot C_{SB2})/(C_{SB1}+C_{SB2})$ not concerning measurement are much smaller that the capacitance $C_B$ concerning measurement. Therefore, the effect of these capacitors is considerably low.

The above description is applicable to the first electrode unit 15.

Figure 6:
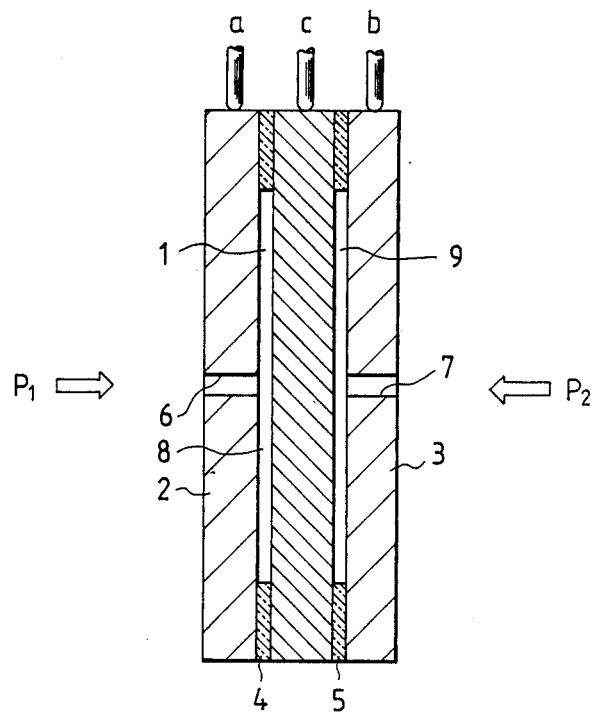
FIG. 6 is a sectional view showing a conventional electrostatic capacity type pressure detector.
Figure 7:
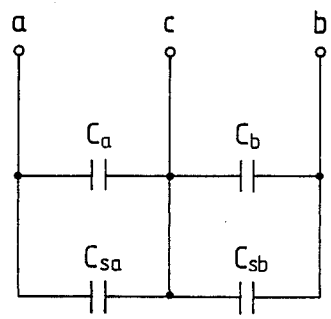
FIG. 7 is a circuit diagram showing the connection of capacitances in the detector shown in FIG. 6.

With respect to the capacitances $C_A$ and $C_B$ concerning the measurement, the undesirable capacitances $C_{SA}$, and $(C_{SA1} \cdot C_{SA2})/(C_{SA1}+C_{SA2})$, $C_{SB}$, and $(C_{SB1} \cdot C_{SB2})/(C_{SB1}+C_{SB2})$ not concerning the measurement will be mathematically described similarly to the case of FIG. 6.

As is apparent from equation (23), the capacitance of the series circuit of $C_{SB1}$ and $C_{SB2}$, because it is much smaller than the capacitances $C_B$ and $C_{SB}$, can be disregarded. Therefore, the circuit diagram of the part (a) of FIG. 4 can be rewritten as shown in the part (b) of FIG. 4. That is, $$C_1 = C_A + C_{SA} \qquad (24)$$

$$C_2 = C_B + C_{SB} \qquad (25)$$

It is assumed that the diaphragm 10 is shifted by $\Delta$ to the left by the difference between the pressures $P_1$ and $P_2$. Similarly, as in equations (7) and (8), $C_A$ and $C_B$ can be represented by the following equations:

$$C_A = \epsilon_A \cdot S_A/(d_A - \Delta) \qquad (26)$$

$$C_B = \epsilon_B \cdot S_B/(d_B - \Delta) \qquad (27)$$

In this connection, $\epsilon_A$ and $\epsilon_B$ are the dielectric constants of the air gaps 29 and 30 and, therefore, $\epsilon_A = \epsilon_B = \epsilon$, and $d_A$ and $d_B$ are the length of the gaps 29 and 30 provided before the diaphragm is shifted. Therefore, $d_A = d_B = d$, $S_A$ and $S_B$ are the areas of the first electrically conductive plates 12 and 17, and $S_A = S_B = S$. Therefore, equations (26) and (27) can be rewritten as follows:

$$C_A = \epsilon \cdot S/(d_o - \Delta) \qquad (28)$$

$$C_B = \epsilon \cdot S/(d_o + \Delta) \qquad (29)$$

The capacitances $C_{SA}$ and $C_{SB}$ are handled in the same manner. That is, $d_{SA} = d_{SB} = d_{SO}$, $\epsilon_{SA} = \epsilon_{SB} = \epsilon_{SO}$, $S_{SA} = S_{SB} = S_{SO}$, and $C_{SA} = C_{SB} = C_{SO}$ are established.

Therefore, equations (24) and (25) can be rewritten as follows:

$$C_1 = C_A + C_{SO} \qquad (30)$$
$$= \epsilon \cdot S/(d - \Delta) + C_{SO}$$

$$C_2 = C_B + C_{SO} \qquad (31)$$
$$= \epsilon \cdot S/(d + \Delta) + C_{SO}$$

According to equations (30) and (31) above, the following arithmetic operation is carried out similarly to equation (14):

$$F = (C_1 - C_2)/(C_1 + C_2) \qquad (32)$$
$$= \frac{\Delta/d}{1 + (C_{SO}/C_O)(1 - (\Delta/d)^2)}$$

where $C_o = \epsilon \cdot S/d$ \qquad (33)

In equation (32), $C_{SO}/C_o$ can be represented by the following equation:

$$C_{SO}/C_O = \frac{\epsilon_{SO} \cdot S_{SO}/d_{SO}}{\epsilon \cdot S/d} \qquad (34)$$
$$= \frac{\epsilon_{SO} \cdot S_{SO}}{\epsilon \cdot S} \cdot \frac{d}{d_{SO}}$$

The above-described concrete numeral values are inserted in equation (34):

$$\epsilon = 2.65 \times 8.85 \times 10^{-14} \qquad (35)$$

$$\epsilon_{SO} = 5.8 \times 8.85 \times 10^{-14}$$

$$S = \pi \times (D_1/2)^2$$
$$= 3.14159 \times 0.29^2 = 0.264208 \text{ cm}^2$$

$$S_{SO} = L_o^2 - \pi \times (D_2/2)^2$$
$$= 0.81 - 3.14159 \times 0.335^2$$
$$= 0.45744 \text{ cm}^2$$

$$d = 12 \text{ μm}$$

$$d_{SO} = 0.5 \text{ mm}$$

$$C_{SO}/C_O = 0.91$$

Accordingly, in the electrostatic capacity type pressure detector of the present invention, it is apparent from equation (35) that the condition $C_{SO}/C_o < 1$ is satisfied and, therefore, the effect of $\Delta/d$ in the denominator of equation (32) is substantially eliminated, as a result of which the linearity of the output signal F is remarkably improved.

This improvement can be attributed to the fact that even in the case where the pressure detector of the present invention is made equal in size to a conventional detector, the thickness d$o of the insulating plate provided between the first and second electrically conductive plates can be made larger than the thickness d of the air gap formed between the diaphragm and the first electrically conductive plate.

In the above-described embodiment, the support preferably is made by using the same material as the first electrically conductive plate. However, the invention is not limited thereto or thereby. That is, the support may be formed by using a material different from the which is used for forming the first electrically conductive plate. Alternatively, the support may be formed by using the same insulating material as the insulating plate. The latter method is advantageous in that $d_{so}$ can be made larger than d because $d_{SO}$ is increased as much as the support.

Figure 5:
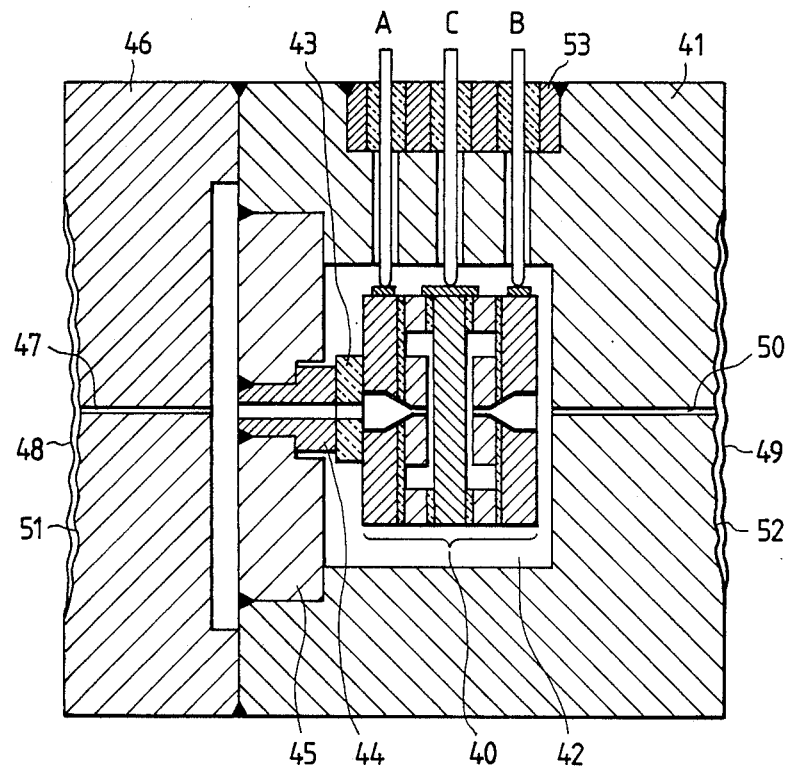
FIG. 5 is a sectional view showing another example of the present invention.

FIG. 5 is a sectional view showing a second embodiment of the pressure transducer of the present invention. In FIG. 5, reference numeral 40 designates an electrostatic capacity type detector, which is equal in construction to the pressure detector shown in FIG. 1. The detector 40 is accommodated in an inner chamber 42 of a bottomed cylinder 41 having an opening, and is connected through an insulating member 43 to a metal pipe 44. The metal pipe 44 is welded to a mounting board 45, which is also welded to the opening of the bottomed cylinder 41. A cap 46 is welded to the opening of the bottomed cylinder 41. The cap 46 has a through-hole 47. A seal diaphragm 48 is bonded to the outer surface of the cap 46 to form a pressure receiving chamber 51 between the seal diaphragm 48 and the outer surface of the cap 46.

On the other hand, a through-hole 50 is formed in the bottom of the cylinder 41, and a seal diaphragm 49 is bonded to the outer surface of the bottom of the cylinder 41 to form a pressure receiving chamber 52 therebetween. A hermetic seal terminal board 53 having lead pins A, B, and C is provided on a cylindrical wall of the bottomed cylinder 41. The space between the seal diaphragms 48 and 49, that is, the inner chamber 42, the through-holes 47 and 50, and the pressure receiving chambers 51 and 52, are filled with a non-compressive fluid such as silicon oil. Pressure exerted on the seal diaphragms 48 and 49 is transmitted through the silicon oil to the diaphragm of the detector 40.

As is apparent from the above description, the pressure difference arithmetic signal on the electrostatic capacity of the electrostatic capacity type pressure detector can be improved in linearity with the pressure detector's entire arrangement maintained unchanged.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrostatic capacitance type pressure detector comprising:
   a diaphragm deformable by pressure;
   a pair of fixed electrodes, each electrode including a pressure introducing hole for introducing pressure into a space defined by said electrode, said pressure introducing hole, and said diaphragm, each of said holes having an inner wall, a different one of said fixed electrodes being provided on each side of said diaphragm, and being separated therefrom by a predetermined distance to form a respective capacitance between said diaphragm and each of said fixed electrodes, each of said fixed electrodes including:
   a first electrically conductive plate confronting said diaphragm and separated therefrom by a gap;
   an insulating plate having a first side joined to said first electrically conductive plate and a second side; and
   a second electrically conductive plate joined to said second side of said insulating plate;
   conductor means for electrically connecting said first electrically conductive plate and said second electrically conductive plate; and
   an annular support joined to said diaphragm and to said insulating plate so as to surround said first electrically conductive plate, said annular support being electrically insulated from said first electrically conductive plate.

2. The electrostatic capacitance type pressure detector of claim 1, further including spacer means for bonding said annular support in each of said electrodes, the width of said spacer means determining the width of the gap between the first electrically conductive plate and the diaphragm.

3. The electrostatic capacitance type pressure detector of claim 2, wherein said spacer means comprises one of baked glass powder or Al-Si eutectic.

4. The electrostatic capacitance type pressure detector of claim 2, wherein said annular support and said first electrically conductive plate are formed from a plate of electrically conductive material, and said annular support is electrically connected to said diaphragm.

5. The electrostatic capacitance type pressure detector of claim 1, wherein said first and second electrically conductive plates are made of silicon, and said insulating plate is made of cordierite.

6. The electrostatic capacitance type pressure detector of claim 1, wherein said first electrically conductive plate, said second electrically conductive plate, and said annular support are joined to said insulating plate by glass powder baking.

7. The electrostatic capacitance type pressure detector of claim 1, wherein in each of said electrodes, said first electrically conductive plate is electrically connected to said second electrically conductive plate through a conductor film formed on an inner wall of said pressure introducing hole.

* * * * *